(12) United States Patent
Cooper

(10) Patent No.: US 8,460,493 B2
(45) Date of Patent: Jun. 11, 2013

(54) EVACUATION AND PORT SEALING TECHNIQUES FOR VACUUM INSULATING GLASS UNITS, AND/OR VACUUM OVEN FOR ACCOMPLISHING THE SAME

(75) Inventor: David J. Cooper, Canton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 721 days.

(21) Appl. No.: 12/000,652

(22) Filed: Dec. 14, 2007

(65) Prior Publication Data
US 2009/0151853 A1 Jun. 18, 2009

(51) Int. Cl.
*B32B 37/04* (2006.01)
(52) U.S. Cl.
USPC ......................................................... 156/104
(58) Field of Classification Search
USPC ......................................................... 156/104
See application file for complete search history.

(56) References Cited

U.S. PATENT DOCUMENTS

| | | | | |
|---|---|---|---|---|
| 3,217,088 | A | * | 11/1965 | Steierman ................ 65/43 |
| 3,632,324 | A | * | 1/1972 | Sasaki et al. ............. 65/43 |
| 5,005,557 | A | * | 4/1991 | Bachli .................... 126/572 |
| 5,657,607 | A | | 8/1997 | Collins et al. |
| 5,664,395 | A | | 9/1997 | Collins et al. |
| 5,902,652 | A | | 5/1999 | Collins et al. |
| 6,365,242 | B1 | | 4/2002 | Veerasamy |
| 6,383,580 | B1 | | 5/2002 | Aggas |
| 6,399,169 | B1 | | 6/2002 | Wang et al. |
| 6,444,281 | B1 | | 9/2002 | Wang et al. |
| 6,503,583 | B2 | | 1/2003 | Nalepka et al. |
| 6,541,083 | B1 | | 4/2003 | Landa et al. |
| 6,635,321 | B2 | | 10/2003 | Wang et al. |
| 6,641,689 | B1 | | 11/2003 | Aggas |
| 6,692,600 | B2 | | 2/2004 | Veerasamy et al. |
| 6,701,749 | B2 | | 3/2004 | Wang et al. |
| 6,946,171 | B1 | | 9/2005 | Aggas |
| 7,244,480 | B2 | | 7/2007 | Minaai et al. |

FOREIGN PATENT DOCUMENTS

| | | |
|---|---|---|
| EP | 1 157 976 | 11/2001 |
| EP | 1 216 971 | 6/2002 |
| EP | 1 571 134 | 9/2005 |

\* cited by examiner

*Primary Examiner* — Yogendra Gupta
*Assistant Examiner* — John Robitaille
(74) *Attorney, Agent, or Firm* — Nixon & Vanderhye P.C.

(57) ABSTRACT

Certain example embodiments of this invention relate to evacuation and sealing techniques for VIG units, and/or multi-chamber vacuum ovens for accomplishing the same. In certain example embodiments, a VIG assembly is inserted into a multi-chamber apparatus to successively reduce the chamber pressure and thus the pressure between substrates comprising the VIG assembly until a final evacuation pressure is reached. Once the final evacuation pressure is reached, a pump-out port or tube of the VIG assembly is sealed forming a VIG unit while the VIG assembly is still in the vacuum chamber. After sealing, chamber pressures are gradually increased to atmospheric while the gap between the substrates of the VIG unit remains at a pressure less than atmospheric which is close to the final evacuation pressure.

21 Claims, 8 Drawing Sheets

EVACUATION AND PORT SEALING TECHNIQUES FOR VACUUM INSULATING GLASS UNITS, AND/OR VACUUM OVEN FOR ACCOMPLISHING THE SAME

FIELD OF THE INVENTION

Certain example embodiments of this invention relate to evacuation and sealing techniques for vacuum insulating glass (VIG) units. More particularly, certain example embodiments relate to evacuation and sealing techniques for VIG units, and/or multi-chamber vacuum ovens for accomplishing the same. In certain example embodiments, a VIG assembly (prior to finalization) is inserted into a multi-chamber apparatus to successively reduce the chamber pressure and thus the pressure between substrates of the VIG assembly until a final or substantially final evacuation pressure is reached. Once substantially the final evacuation pressure is reached, a pump-out port or tube of the VIG assembly is sealed in forming a VIG unit while the VIG assembly is still in the vacuum chamber. After sealing, chamber pressures are gradually increased to or toward atmospheric while the gap between the substrates of the VIG unit remains at a pressure less than atmospheric which is close to the final evacuation pressure.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space/gap 6. After evacuation, tube 8 is melted to seal the vacuum. Recess 11 retains sealed tube 8. Optionally, a chemical getter 12 may be included within gap 13.

A typical apparatus for pumping down and sealing of the VIG unit is disclosed in U.S. Pat. No. 7,244,480, the entire contents of which are incorporated herein by reference. In the FIG. 3 embodiment of the '480 patent, for example, while the whole VIG unit is in the atmosphere, the evacuation was accomplished through a pumping port tube using an upside-down cup connected to the vacuum system. Once the pump-down is completed, the pumping port is sealed by tipping off the tube using a device, which can be either a wire heater, or focused IR source, or a laser, or other heating devices.

Although this approach appears to be effective in a batch type of operation, it is disadvantageous in an in-line type of VIG production system. For example, the vacuum line has to travel the whole distance with the VIG unit, which results in complicated machinery design and more potential machine failures.

Thus, it will be appreciated that there is a need in the art for improved techniques for evacuating and/or sealing vacuum IG units.

An aspect of certain example embodiments relates to providing staged pressure reductions, pump-out port sealing, and staged pressure increases via a unitized oven.

In certain example embodiments of this invention, a method of making a vacuum insulating glass (VIG) window unit is provided. An oven including a pressure reducing zone, a port sealing zone, and a pressure increasing zone is provided. Inserted into the oven is a unit comprising first and second substantially parallel spaced-apart glass substrates, a gap defined by an area between the spaced apart substrates, and a pump-out port formed in the first or second substrate. The pressure reducing zone of the oven is evacuated to at least one reduced pressure to also evacuate the gap of the unit, each said reduced pressure being below atmospheric. The port sealing zone is evacuated to a final evacuation pressure to further evacuate the gap or recess of the unit below the at least one reduced pressure. The pump-out port of the unit is sealed during or after the port sealing zone evacuation in forming a vacuum insulating glass (VIG) unit. The pressure increasing zone is vented so as to bring a pressure of the pressure increasing zone closer to atmospheric.

In certain example embodiments, a method of making a vacuum insulating glass (VIG) window unit is provided. Inserted into the oven is a unit comprising first and second substantially parallel spaced-apart glass substrates, a recess or gap defined by an area between the spaced apart substrates, a pump-out port formed in the first or second substrate, one or more edge portions of the first and second substrates to be sealed, and a frit provided at least partially between the first and second glass substrates for sealing said one or more edge portions to be sealed. The unit is pre-heated substantially in its entirety to at least one intermediate temperature, each said intermediate temperature in the pre-heating being below a melting point of the first and second substrates and below a melting point of the frit. Localized near infrared (IR) inclusive heat is provided to the unit proximate to the edge portions to be sealed so as to at least partially melt the frit, the localized near IR heat being provided to the unit such that at least some areas of the unit not proximate to the edge portions to be sealed are kept at a temperature(s) below frit-melting temperature. The unit is cooled and the frit is allowed to harden. The gap of the unit is evacuated to at least one reduced pressure, each said reduced pressure being below atmospheric. The gap of the unit is further evacuated to a final evacuation pressure, the final evacuation pressure being below the at least one reduced pressure. The pump-out port of the unit is sealed during or after the evacuating of the gap to the final evacuation pressure in forming a vacuum insulating glass (VIG) unit. An area around the unit is vented so as to bring a pressure of the area closer to atmospheric.

In certain example embodiments, an apparatus for evacuation and sealing for vacuum insulating glass units is provided. An entrance zone receives a unit comprising first and second substantially parallel spaced-apart glass substrates, a gap defined by an area between the spaced apart substrates, and a pump-out port formed in the first or second substrate. A pressure reducing zone evacuates a pressure therein to at least one reduced pressure to also evacuate the gap of the unit, each said reduced pressure being below atmospheric. A port sealing zone evacuates a pressure therein to a final evacuation pressure to further evacuate the gap of the unit below the at least one reduced pressure, and seals the pump-out port of the unit during or after the evacuating of the port sealing zone in forming a vacuum insulating glass (VIG) unit. A pressure increasing zone increases a pressure therein so as to bring the pressure of the pressure increasing zone closer to atmospheric.

In certain example implementations, such an apparatus may comprise a pre-heating zone for pre-heating the unit substantially in its entirety to at least one intermediate temperature, each said intermediate temperature being below a melting point of the first and second substrates and below a melting point of the frit; an edge sealing zone including a localized heat source for providing localized heat to the unit proximate to the edge portions to be sealed at a frit melting temperature, the frit melting temperature being sufficiently high enough to melt the frit, the localized heat being provided to the unit such that areas of the unit not proximate to the edge portions to be sealed are maintained at a temperature close to an intermediate temperature; and a cooling zone of the oven for cooling the unit in its entirety to at least one reduced temperature and allowing the frit to harden.

In certain example implementations, a single chamber or a single set of chambers may be configured to provide the functionality of multiple zones. In certain example implementations, the zones may be arranged in line and in the following order: the entrance zone, the pre-heating zone, the edge sealing zone, the cooling zone, the pressure reducing zone, the port sealing zone, and the pressure increasing zone.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to at least the evacuation of the gap including, for example, two parallel-spaced apart substrates and a frit. Also, while the frit may be said to be "on" or "supported" by one or more of the substrates herein, this does not mean that the frit must directly contact the substrate(s). In other words, the word "on" covers both directly and indirectly on, so that the frit may be considered "on" a substrate even if other material (e.g., a coating and/or thin film) is provided between the substrate and the frit.

In certain example embodiments of this invention, there is provided a method of pumping down and sealing of a pumping tube for vacuum insulating glass units via a multi-chamber vacuum oven. An edge-sealed VIG unit is sent into a vacuum oven to be evacuated to high vacuum while being heated to a proper temperature for out-gassing through staged pumping down and heating. The tube sealing process is performed inside the vacuum chamber. The sealed VIG passes through an exit chamber to be vented to the air and cooled down. The techniques of certain example embodiments reduce (and sometimes even eliminates) the need for using pumping cups which, in turn, reduces the working space required for sealing processes. It also may sometimes eliminate the process step of installing such a cup on each VIG assembly. Moreover, the techniques of certain example embodiments tend to offer better compatibility with in-line process systems.

The unitized oven of certain example embodiments includes multiple chambers. Generally, the chambers will correspond to a pressure reducing zone, a port or tube sealing zone, and a pressure increasing zone. It will be appreciated that an illustrative unitized oven may include multiple chambers for accomplishing the functionality of a single zone (e.g., pressure reducing chambers may be provided for performing pressure reducing zone functionality, two pressure increasing chambers may be providing for performing pressure increasing zone functionality, etc.), and/or that a single chamber may be provided to accomplish the functionality associated with multiple zones (for example, a single chamber may provide pressure reducing and pressure increasing functionality, etc.).

Figure 3:
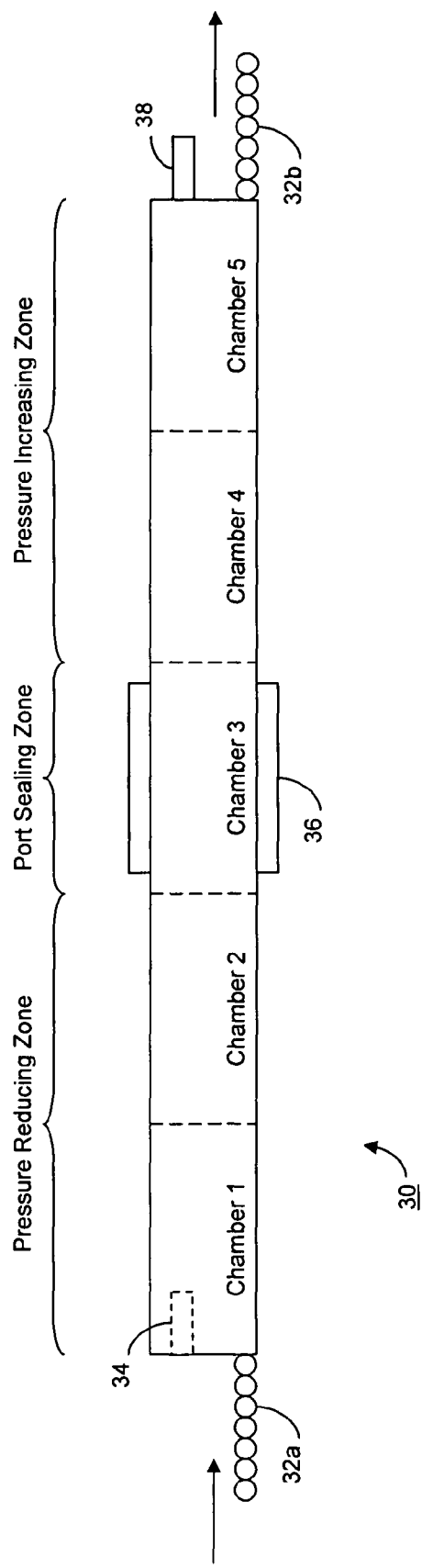
FIG. 3 is a simplified side view illustrating an example layout of a five chamber oven for evacuation and pump-out port sealing in accordance with an example embodiment.

By way of example and without limitation, FIG. 3 is a simplified side view illustrating an example layout of a five chamber oven 30 for evacuation and pump-out port sealing in accordance with an example embodiment. However, as alluded to above, it will be appreciated that more or fewer chambers may be employed. In certain non-limiting implementations, adjacent chambers may be separated (as represented by dashed lines in between adjacent chambers) by gate or slide valves, or by other means for sealing off the pressure between adjacent chambers. Linkage, pulleys, and/or other means may be provided to open and close such doors.

The unitized oven 30 of certain example embodiments is continuous or semi-continuous in terms of product flow. A roller conveyer 32, conveyor belt, or other transport technique may be used to physically move a given VIG assembly from one zone and/or chamber to the next so that the VIG assembly and/or its contents are not disturbed or repositioned relative to one another. At a start point 32a, the roller conveyer 32 feeds VIG assemblies into the oven 30, e.g., through a first door 34. VIG assemblies may be moved into place and stopped when they reach a proper position within a chamber and/or zone. The position of the VIG assembly may be determined, for example, by photo-eye or other detection means. By way of example and without limitation, the position may be the center of a particular chamber, aligned within particular horizontal and vertical positions (e.g., as described in greater detail below in relation to FIG. 6), etc. In certain example embodiments, it may be advantageous to temporarily stop a VIG assembly at a particular location, for example, to allow the VIG assembly to heat sufficiently, to enable precise port or tube sealing, to allow a solder frit to melt, etc.

In certain example embodiments, multiple VIG assemblies may be fed into the oven 30 at the same time so that they are processed in batch. For example, in a five-chamber oven like the one shown in FIG. 3, up to five VIG assemblies may be processed by the oven at a time, with the process being started and stopped in dependence on the progress of each chamber. Thus, there may be some delay built into the process to account for the different process times of the different zones and/or chambers.

Figure 5:
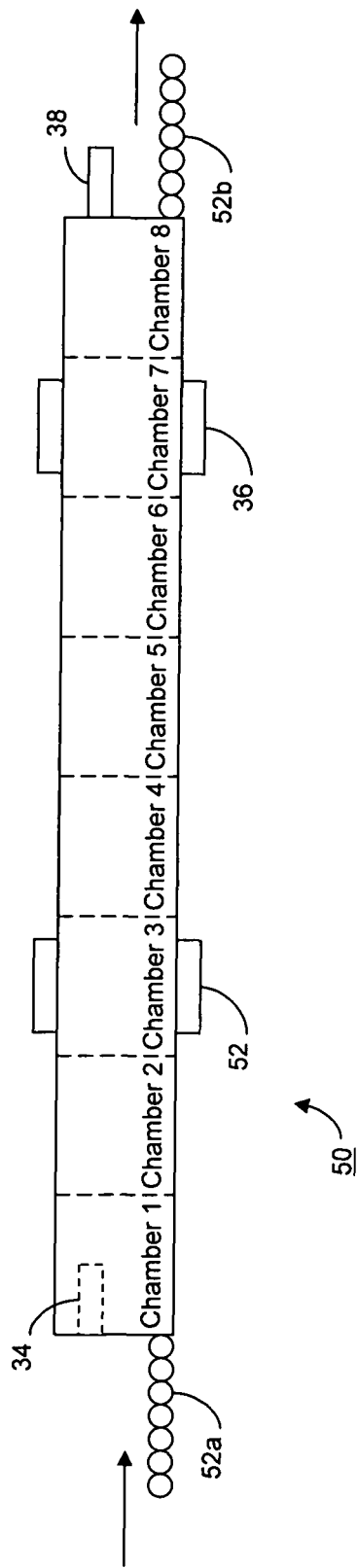
FIG. 5 is a simplified side view illustrating an example layout of an eight chamber oven for edge sealing, evacuation, and pump-out port sealing in accordance with an example embodiment.

In connection with the example implementation shown in FIG. 5, a VIG assembly having sealed edges is input into the vacuum oven system 30. In certain example embodiments, a pumping tube or other means in which to evacuate the annular space between the glass plates is attached to the pump-out port. A first chamber is a vacuum loadlock that cycles between atmospheric pressure and low vacuum. The edge-sealed VIG assembly is pumped-down from atmospheric to a first reduced pressure, the pressure being below approximately 1 torr.

The edge-sealed VIG assembly is moved to the next chamber for further pump-down and evacuation. A second chamber is a transfer chamber that further pumps-down the edge-sealed VIG assembly from below about 1 torr to below about $10^{-2}$ torr, thereby preparing the edge-sealed VIG assembly for the high vacuum conditions of the third chamber.

In certain example embodiments, heating elements may be installed in one or both of the first and second chambers, e.g., to sequentially heat the edge-sealed VIG assembly to a pre-determined temperature (e.g., around 200° C.) to accelerate out-gassing in the third chamber. In certain example embodiments, this predetermined temperature is a temperature that vacuum components, such as o-rings, can tolerate, thereby protecting the vacuum system components from being damaged or even destroyed by high temperatures.

The edge-sealed VIG assembly is transported through a valve to the third chamber, which is the pump-down chamber. Here, the edge-sealed VIG assembly reaches the ultimate vacuum level (e.g., a final evacuation pressure below about $10^{-5}$ torr) under a bake temperature provided by any suitable heating device. In addition, in certain example embodiments, a gas purging cycle may be employed to cycle the unit from high vacuum and flush with a process gas such as Argon, Nitrogen, or other suitable gas. Furthermore, plasma cleaning process may be implemented in connection with certain example embodiments. In such a case, a plasma may be struck, e.g., using a Tesla coil, after such a purge to knock loose and subsequently remove excess molecules, and this process may be repeated several times. Further details of gas purging and plasma cleaning are disclosed, for example, in commonly assigned U.S. Pat. No. 6,692,600, the entire contents of which are hereby incorporated herein by reference.

Once the final evacuation pressure is reached, the pump-out port is sealed. This may be accomplished using a sealing device 36, which may be located within or outside of the chamber. For example, sealing devices within the chamber may comprise a heating element may melt a tube inserted into the pump-out port, a mechanical device such as a cork or plate (e.g., a metal, glass, or other plate) may be inserted into the pump-out port and then sealed, etc. This may be accomplished using a sealing device from outside of the chamber. For example, a microwave, laser, focused infrared (IR) source, or other means, may be directed through an optical path, e.g., to melt a tube or other material provided in or proximate to the pump-out port, e.g., to partially collapse the tube or other material and at least partially form a seal. For example, a small viewing port may be provided to the chamber, and energy may be directed through the port and focused and/or directed to an appropriate location, e.g., using lenses, mirrors, and/or other optical elements.

Figure 2:
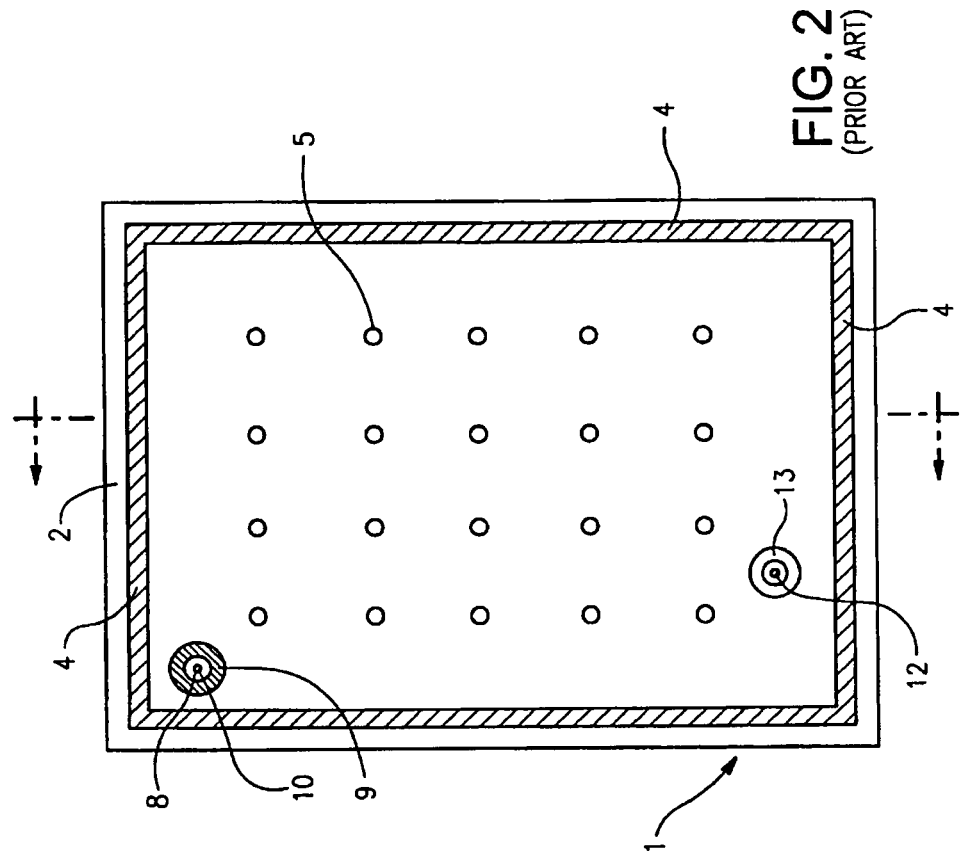
FIG. 2 is a prior art top plan view of the bottom substrate, edge seal, and spacers of the FIG. 1 vacuum IG unit taken along the section line illustrated in FIG. 1.
Figure 1:
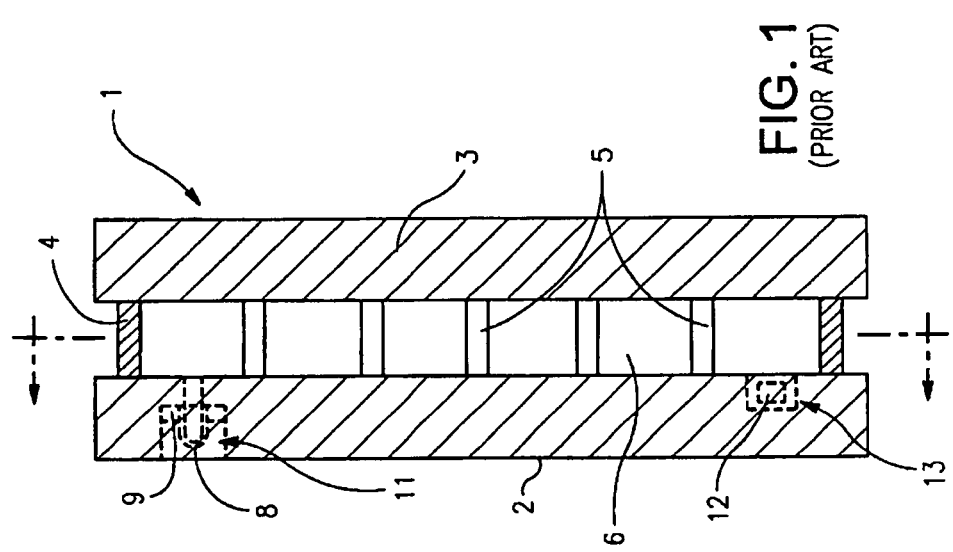
FIG. 1 is a prior art cross-sectional view of a conventional vacuum IG unit.

The completely sealed unit, now a VIG unit, is transported through the valve locks into one or more vent chambers, where the unit is gradually vented to atmosphere. In the meantime, the temperature also may be reduced. At the exit 38 (FIG. 2, item 9), an optional air blower (not shown in FIG. 3) may be installed to further cool down the unit, e.g., to below about 50° C. for safe handling.

In another example implementation, the basic vacuum oven described above can be combined with an in-line edge seal system to form a in-line system for the complete VIG assembly thermal cycle.

Figure 4:
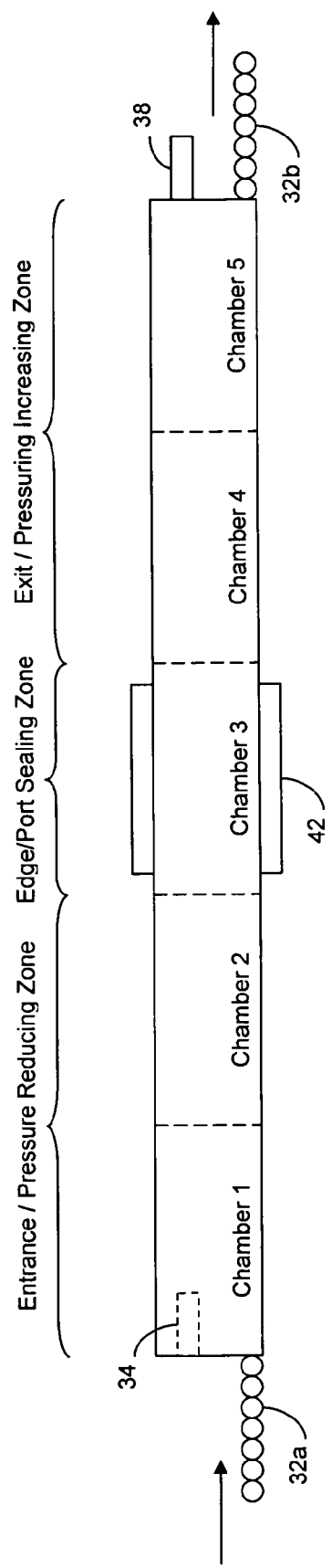
FIG. 4 is a simplified side view illustrating an example layout of a five chamber oven for edge sealing, evacuation, and pump-out port sealing in accordance with an example embodiment.

One illustrative arrangement for providing such features is shown in FIG. 4, which is a simplified side view illustrating an example layout of a five chamber oven 40 for edge sealing, evacuation, and pump-out port sealing in accordance with an example embodiment.

In connection with the evacuation and port sealing techniques described above in a five chamber system (e.g., as described with reference to FIG. 3), a method of preferential heating for frit edge seal of vacuum insulated glass units using a unitized zoned oven is provided. The following description refers to various zone and chambers, which in certain example implementations are intended to correspond to the zones and chambers described above with reference to FIG. 3. Thus, for example, a first chamber of oven 40 may both increase the temperature of the VIG assembly as a whole and also reduce the pressure.

The pre-assembled unit is first heated to an intermediate temperature lower than that required to melt the frit seal (e.g., a temperature of about 200-300° C.). Then, the edge of the unit is further heated with localized heat from a substantially linear focused infrared (IR) heat source that is configured to generate IR radiation at a near infrared wavelength (e.g., a wavelength of about 0.7-5.0 μm) and, more preferably, of about 1.1-1.4 μm, in order to provide a localized temperature of from about 350-500° C. until the frit is melted. At the same time, if tempered or heat strengthened glass is used, at least certain portions of a thermally tempered glass sheet(s)/substrate(s) of the VIG unit lose no more than about 50% of original temper strength, as the majority of the area is still under the intermediate temperature. Because of the overall lower temperature, the techniques of certain example embodiments advantageously consume less energy and save time when the samples cool down. It will be appreciated that the localized temperature may be determined based in part on the material(s) comprising the frit. For example, lead-inclusive frits tend to require lower temperatures than silver-inclusive frits.

Generally, the chambers will correspond to an entrance zone, an edge sealing zone, and an exit zone. It will be appreciated that an illustrative unitized oven may include multiple chambers for accomplishing the functionality of a single zone (e.g., two entrance chambers may be provided for performing entrance zone functionality, two exit chambers may be providing for performing exit zone functionality, etc.), and/or that a single chamber may be provided to accomplish the functionality associated with multiple zones (for example, a single chamber may provide entrance and exit zone functionality, etc.).

The unitized oven 40 of certain example embodiments is semi-continuous in terms of product flow. A roller conveyer 32 or other transport technique may be used to physically move a given VIG assembly from one zone and/or chamber to the next so that the VIG assembly and/or its contents are not disturbed or repositioned relative to one another. At a start point 32a, the roller conveyer 32 feeds VIG assemblies into the oven 40, e.g., through a first door 34. VIG assemblies may be moved into place and stopped when they reach a proper position within a chamber and/or zone. The position of the VIG assembly may be determined, for example, by photo-eye or other detection means. By way of example and without limitation, the position may be the center of a particular chamber, aligned within particular horizontal and vertical positions (e.g., as described in greater detail below in relation to FIG. 6), etc. In certain example embodiments, it may be advantageous to temporarily stop a VIG assembly at a particular location, for example, to allow the VIG assembly to heat sufficiently, to allow a solder frit to melt, etc.

In certain example embodiments, multiple VIG assemblies may be fed into the oven 40 at the same time so that they are processed in batch. For example, in a five-chamber oven like the one shown in FIG. 4, up to five VIG assemblies may be processed by the oven at a time, with the process being started and stopped in dependence on the progress of each chamber. For example, the edge sealing zone may require more time than the cooling performed in the exit zone chambers. Thus, there may be some delay built into the process to account for the different process times of the different zones and/or chambers.

The entrance zone (e.g., chambers 1 and 2 in the FIG. 4 example embodiment) is equipped with substantially uniform heat sources so that the VIG assembly is heatable in stages. That is, substantially uniform heat may be applied to the VIG assembly so as to substantially uniformly heat the entire VIG assembly. Heating may be accomplished via IR radiation from an IR heat source or other means so as to reduce disturbance of the VIG assembly or its contents.

In an edge sealing zone (e.g., chamber 3 of FIG. 4), substantially uniform heating sources are installed to maintain the VIG assembly as a whole at a predetermined background temperature. This may be accomplished by maintaining the entire VIG assembly at the intermediate temperature from the entrance zone and/or slightly increasing the temperature from the entrance zone. In the meantime, substantially linear focused IR heat sources 42 supply localized heating to the perimeter of the VIG assembly so as to melt the ceramic frit applied to the edges. IR heat may be focused on peripheral edges, for example, by means of a parabolic mirror on an edge opposite to the VIG assembly. Further details of an example focusing mechanism are provided below with reference to FIG. 7. Although this particular zone is termed an edge sealing zone, it will be appreciated that some edge sealing may occur in other zones. For example, most melting will occur within the edge sealing zone and some edge sealing will take place once the IR radiation sources are powered down, although the edges may continue to seal (e.g., the frit may begin or continue to harden) while in the exit zone.

Figure 6:
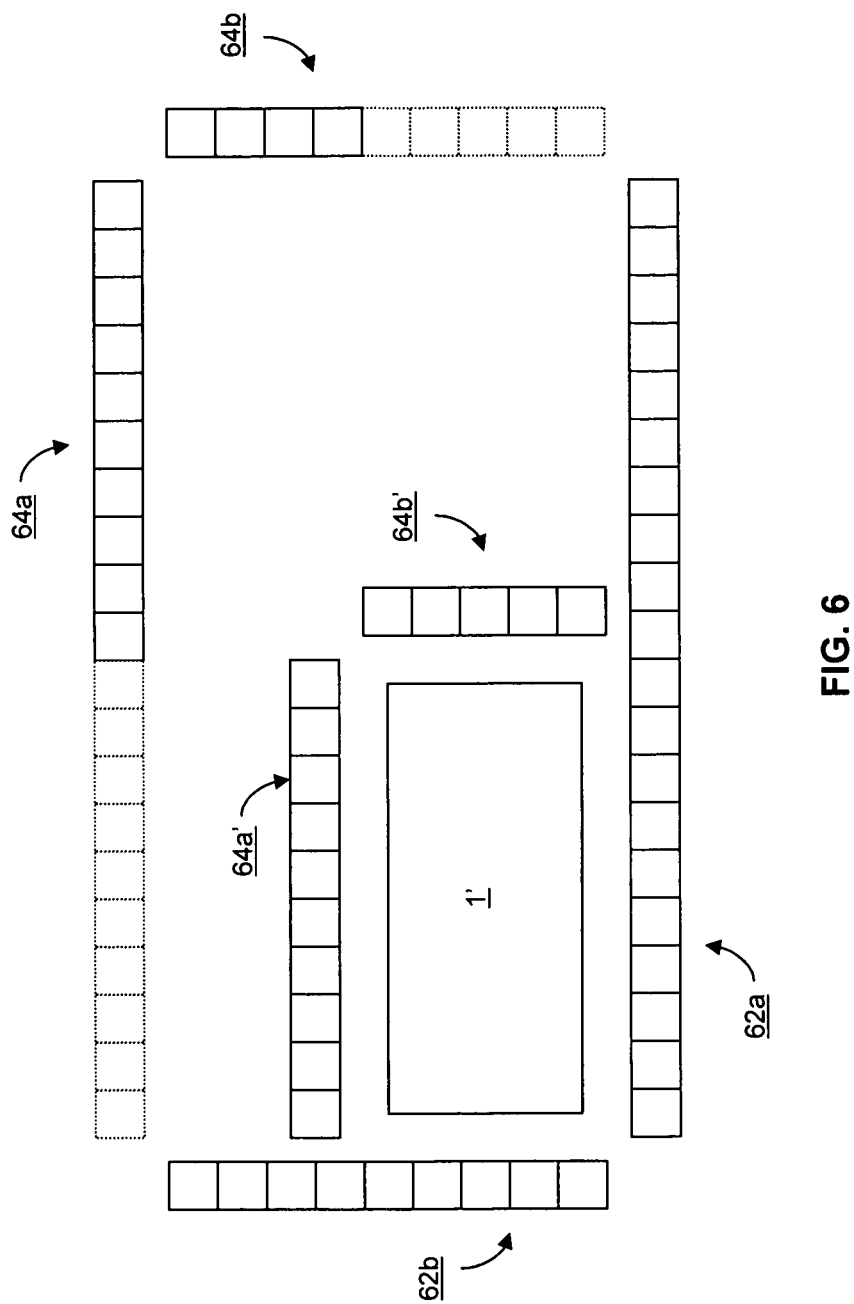
FIG. 6 is an overhead view of the moving concentration of IR heat sources in the edge sealing zone of a unitized oven in accordance with an example embodiment.

FIG. 6 is an overhead view of the moving concentration of IR heat sources 62 and 64 in the edge sealing zone of a unitized oven in accordance with an example embodiment. As shown in FIG. 6, the frit melting oven is designed such that variously sized VIG assemblies may be sealed. In certain example embodiments, one corner of the focused IR bank is fixed in position (e.g., the corner proximate to banks 62a-b). In the FIG. 6 example, banks 62a-b are fixed in position. In such example arrangements, only two sides of the focused IR bank would need to be repositioned to ensure proper frit melting. The IR sources also may be segmented into sections so that a part or all of the sections can be turned on at any time to adjust the length of heating to that of the VIG assembly size. Parts of these IR source banks 64a-b may be moved into various positions around the perimeter of the VIG assembly by mechanical means, such as, for example, arms, rollers on a rail, and/or other linkages. In FIG. 6, this is shown as banks 64a-b being segmented and bank segments 64a'-b' being moved from their initial positions (designated by the dotted lines in the banks 64a-b) to positions proximate to the VIG assembly 1' (designated by the solid lines) to be edge sealed. In the FIG. 6 embodiment, only IR sources corresponding to banks 64a'-b' and parts of 62a-b would be turned on; the rest of the IR sources in banks 64a-b and the non-proximate IR sources in banks 62a-b need not be turned on (e.g., they would may remain off).

Thus, as is shown in FIG. 6, the localized heat source comprises first, second, third, and fourth banks of infrared heat source elements, the banks being arranged such that the infrared heat source is substantially rectangularly shaped within the edge melting zone. The first and second banks are fixed in position and constitute two substantially perpendicular legs of the substantially rectangularly shaped infrared heat source, and the third and fourth banks constitute the other two substantially perpendicular legs of the substantially rectangularly shaped infrared heat source. The infrared heat source elements of the second and third banks are movable in dependence on a size of the unit so as to move closer to the edges to be sealed.

In addition, the angle of the focusing mirror may be adjustable in certain example embodiments to allow the heat to be focused more precisely on the VIG assembly perimeters (as described in greater detail below with reference to FIG. 7). In certain example embodiments, the IR segmented source movement and/or focusing may be computer-controlled to adjust the results of the individual units. Still further, the VIG assembly 1' to be edge sealed may be elevated such that it is more proximate to the IR sources. This may be accomplished by moving it into a proper X-Y position with respect to the IR banks 62a-b, moving portions of the movable IR banks 64a-b, and lifting the VIG assembly 1' into position.

By way of example and without limitation, the IR sources within the banks may be IR tubes. The IR tubes may be close enough to each to provide heating across the edges of the VIG assembly (e.g., without leaving "gaps," or unheated or substantially differently heated areas around the edges), but also may be far enough away from each other to allow for movement of such tubes. Thus, by way of example and without limitation, the IR tubes may be located approximately 5 mm apart in certain example embodiments. The sizes of the banks may vary in dependence on the needs of the VIG unit manufacturing process. Also by way of example and without limitation, banks of about 2-3 meters should accommodate most standard VIG unit manufacturing requirements.

Referring once again to FIG. 4, the VIG assembly may be cooled down in an exit zone comprising one or more chambers, e.g., in a stepwise manner via chambers 4 and 5 of FIG. 4. When a stepwise exit zone arrangement is implemented, each successive exit zone chamber may be maintained at a lower temperature than the previous exit zone chamber. This arrangement may be enabled by using forced convective air cooling, cooling water piping, and/or other cooling means suitable for removing heat from the particular exit zone chamber. Ultimately, the VIG assembly may be rolled out of the oven 40 through exit door 38 via rollers 32b.

Figure 7:
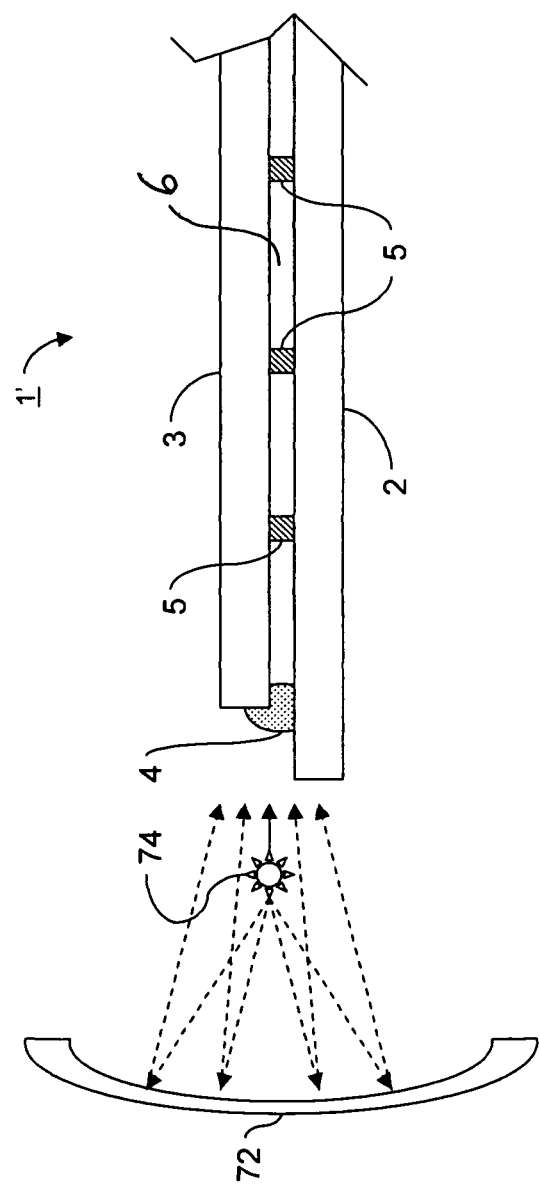
FIG. 7 is a side view of a concentration and/or focusing mirror located proximate to an IR heating element in accordance with an example embodiment.

FIG. 7 is a side view of a concentration and/or focusing mirror 72 located proximate to an IR heating element 74 in accordance with an example embodiment. It will be appreciated that any type of concentrating and/or focusing mechanism may be used in connection with certain other example embodiments. IR radiation from IR heating element 74 is focused and/or concentrated by the parabolic mirror 72 onto or proximate to solder frit 4. The mirror 72 may be moved and/or repositioned to cause more or less of the peripheral edges of the VIG assembly 1' to be heated, to focus IR radiation to or away from the substrates 2 and 3, etc. Note that gap 6 is provided between the substrates.

A more detailed description of the VIG assembly edge sealing process will now be provided. A pre-assembled VIG assembly, which may include a pre-applied and fired perimeter frit ink, enters the oven. In the entrance zone, the VIG assembly is heated up to a predetermined temperature of between about 200-300° C. This may be accomplished using staged heating in one or more entrance chambers, so that the entire VIG assembly is pre-heated to one or more intermediate temperatures. In general, the VIG assembly will enter into the oven at room temperature (e.g., which typically is about 23° C., although it will be appreciated that other processing environments and/or conditions may implement a different "room temperature"). The entire VIG assembly may be heated to about 75° C. in a first entrance zone chamber and then to about 150° C. in a second entrance zone chamber. It will be appreciated that the pre-heating temperatures may vary by about ±50° C.

In the edge sealing zone, the entire VIG assembly is heated to about 200° C., and an IR heat source (e.g., a computer-controlled substantially linear IR heat source) is moved into position and focused around the perimeter of the VIG assembly. The IR heat source is activated at a predetermined distance (e.g., from about 0.5-10 cm) from the edge of the VIG assembly, depending in part on the focusing/concentrating mirror, whether the IR radiation is meant to "contact" the top and/or bottom substrates or just the sides proximate to the frit, etc. As noted above, the IR heat source is focused, e.g., by means of a parabolic mirror provided on a side of the IR heat source opposite to the VIG assembly. The temperature of the frit on the perimeter of the VIG assembly is controlled to about 350-500° C., which is suitable to melt the frit but still below the melting point of the glass substrates, which varies from about 600-800° C. based on the composition of the glass. During the localized heating process in the edge sealing zone, the glass temperature remains at the background temperature. Accordingly, heat strengthened or tempered glass, if utilized, is not de-tempered or suffers a reduced amount of de-tempering during the frit heating and/or melting processes.

Following the frit melting in the edge sealing zone, the VIG assembly is transported to the exit zone. The exit zone may include one or more temperature ramp-down areas (or chambers). The temperature is reduced so that the VIG assembly is at a temperature less than about 100° C. when it exits the oven. In certain example embodiments, in a first exit chamber, the temperature of the entire VIG assembly will be reduced to about 150° C. and then to about 75° C. in a second exit chamber. As above, ramp-down temperatures may vary from these figures by as much as about ±50° C.

Figure 8:
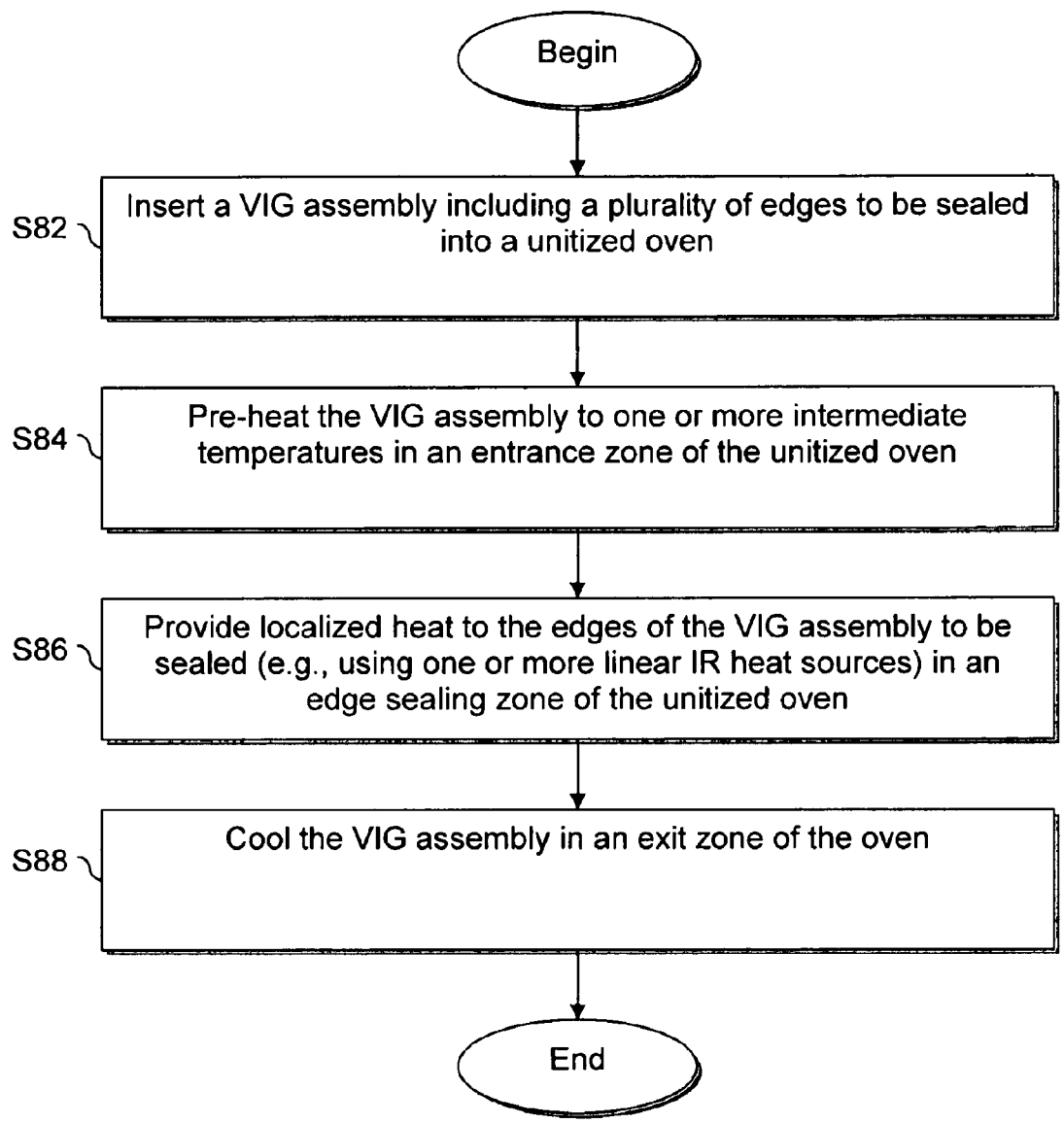
FIG. 8 is an illustrative flowchart showing a process for providing localized heating to frit edge seals of a VIG assembly via a unitized oven, in accordance with an example embodiment.

FIG. 8 is an illustrative flowchart showing a process for providing localized heating to frit edge seals of a VIG assembly via a unitized oven, in accordance with an example embodiment. In step S82, a VIG assembly including a plurality of edges to be sealed is inserted into a unitized oven. A roller conveyer may convey the VIG assembly into the oven, e.g., through a door. In step S84, the VIG assembly is pre-heated to one or more intermediate temperatures in an entrance zone of the unitized oven. The intermediate temperature(s) is/are below the melting points of glass and the frit along the edge to be sealed.

Localized heat is provided to the edges of the VIG assembly to be sealed (e.g., using one or more substantially linear IR heat sources, producing IR radiation having a near infrared wavelength (e.g., a wavelength of about 0.7-5.0 µm) and, more preferably, of about 1.1-1.4 µm) in an edge sealing zone of the unitized oven in step S86. The localized heat is at a temperature above the intermediate temperature(s) and is sufficient to cause the frit around the edges to melt. The temperatures may be chosen in dependence on the composition of the frit material. The VIG assembly, apart from the areas proximate to the peripheral edges to be sealed, are kept at a temperature close to that of the intermediate temperature (e.g., at a temperature sufficiently low so as to avoid melting of the glass, not varying by more than about ±50° C. from an intermediate temperature).

In a step not shown, to provide localized heating, a plurality of heat sources (e.g., substantially linear IR heat sources) are provided, e.g., within a bank. At least some of the banks may be fixed in position. The VIG assembly may be positioned proximate to the fixed banks so that at least some of the edges to be sealed are adjacent to the fixed banks. Additional banks including movable heat sources may be positioned so as to provide heat proximate to the edges of the VIG assembly that are not adjacent to the fixed banks. The areas to be heated may be more finely tuned by providing a concentration and/or focusing mirror.

Referring once again to FIG. 8, in step S88, the VIG assembly is cooled in an exit zone of the oven. The pre-heating and/or cooling of the VIG assembly may be staged so as to reduce the chances of breakage of the VIG assembly and/or de-tempering of the substrates comprising the VIG assembly. In certain example embodiments, multiple chambers may be provided for one or more of the zones. In connection with such embodiments, multiple chambers may be provided for the ramping-up of temperatures and/or the cooling processes, e.g., when the heating and/or cooling processes are staged. In certain other embodiments, a single chamber may be configured to perform the functionality of multiple zones (e.g., a single chamber may pre-heat and/or cool the substrate, a single chamber may pre-heat the substrate and/or provide localized heat to the edges, a single chamber may provide localized heat to the edges and/or cool the substrate, etc.).

Thus, certain example embodiments advantageously heat, melt, and cool the frit quickly. This helps produce a temperature gradient proximate to the edges of the VIG assembly. The temperature gradient, in turn, helps reduce de-tempering and/or the chances of breakage of the glass. In certain example embodiments, at least certain portions of a thermally tempered glass sheet(s)/substrate(s) of the VIG unit lose no more than about 50% of original temper strength.

Another illustrative arrangement for providing evacuation and port sealing as well as edge-sealing features is shown in FIG. 5, which is a simplified side view illustrating an example layout of an eight chamber oven 50 for edge sealing, evacuation, and pump-out port sealing in accordance with an example embodiment. In the FIG. 5 example implementation, chambers 1-4 are non-vacuum chambers and chambers 5-8 are vacuum chambers, although fewer or more chambers may be used. As above, the oven of FIG. 5 may be computer-controlled with the appropriate sensors and monitoring systems described above, e.g., to control the feed and flow of VIG assemblies through the apparatus, and the oven may be continuous or semi-continuous in product flow.

A first or entrance zone (e.g., chambers 1 and 2) are equipped with substantially uniform heat sources so that the whole VIG assembly can be heated up to one or more predetermined intermediate temperatures, e.g., in stages. Heating may be accomplished by IR radiation, microwave, or some other means that does not disturb the VIG assembly or its components.

In a second or edge sealing zone (e.g., chamber 3) the seal or frit around the edges and the pumping tube will be heated up via a heating element 52 to their respective melting temperatures. This can be achieved in any number of ways. For example, the whole chamber may be heated up to the melting temperature of the frit material by uniform heating sources. Alternatively, the chamber may be heated up to the predetermined background or intermediate temperature while focused substantially linear IR heat source(s), microwaves, or other focused heating units provide localized heating on or proximate to the perimeter of the VIG assembly so that the frit applied along the edges is melted.

In a first cooling zone (e.g., chamber 4), the VIG assembly as a whole is cooled down to a predetermined pump-out temperature (e.g., about 200° C.). This temperature helps solidify the edge seal and also helps accelerate the out-gassing from the VIG assembly. It also is a safe temperature for the vacuum components, or a temperature sufficiently low so as to avoid damage to the vacuum chamber and/or its components.

In a pressure reducing zone (e.g., chambers 5 and 6), there is installed a vacuum loadlock that cycles between atmospheric pressure and low vacuum. The VIG assembly first is pumped-down from atmospheric pressure to less than about 1 torr. A transfer chamber (e.g., chamber 6) may be maintained at a lower absolute pressure and also may further pump the unit down from below about 1 torr to below about $10^{-2}$ torr in preparation for entry to the high vacuum regime in the next zone. Heaters may be installed in both the pressure reducing zone, e.g., to increase the VIG assembly temperature gradually to the pump out temperature.

The unit exits the pressure reducing zone and is transported to a port sealing zone (e.g., chamber 7), which is the high vacuum pump-down chamber that includes a port sealing device 36. In this zone, the unit reaches the ultimate vacuum level (e.g., below about $10^{-5}$ torr) while ramping-up to the pump-down temperature with proper heating devices as previously described. Once the set pump-down temperature is reached, the vacuum port is sealed by a robotically controlled sealing device 25, e.g., in one or more of the manners set forth above.

The completely sealed VIG unit is moved into a vent zone (e.g., chamber 8), where the unit will be vented to atmospheric pressure once again. In the meantime the temperature is reduced. At the exit, an air blower or similar device may be installed to further cool down the unit, e.g., to below about 50° C.

Figure 9:
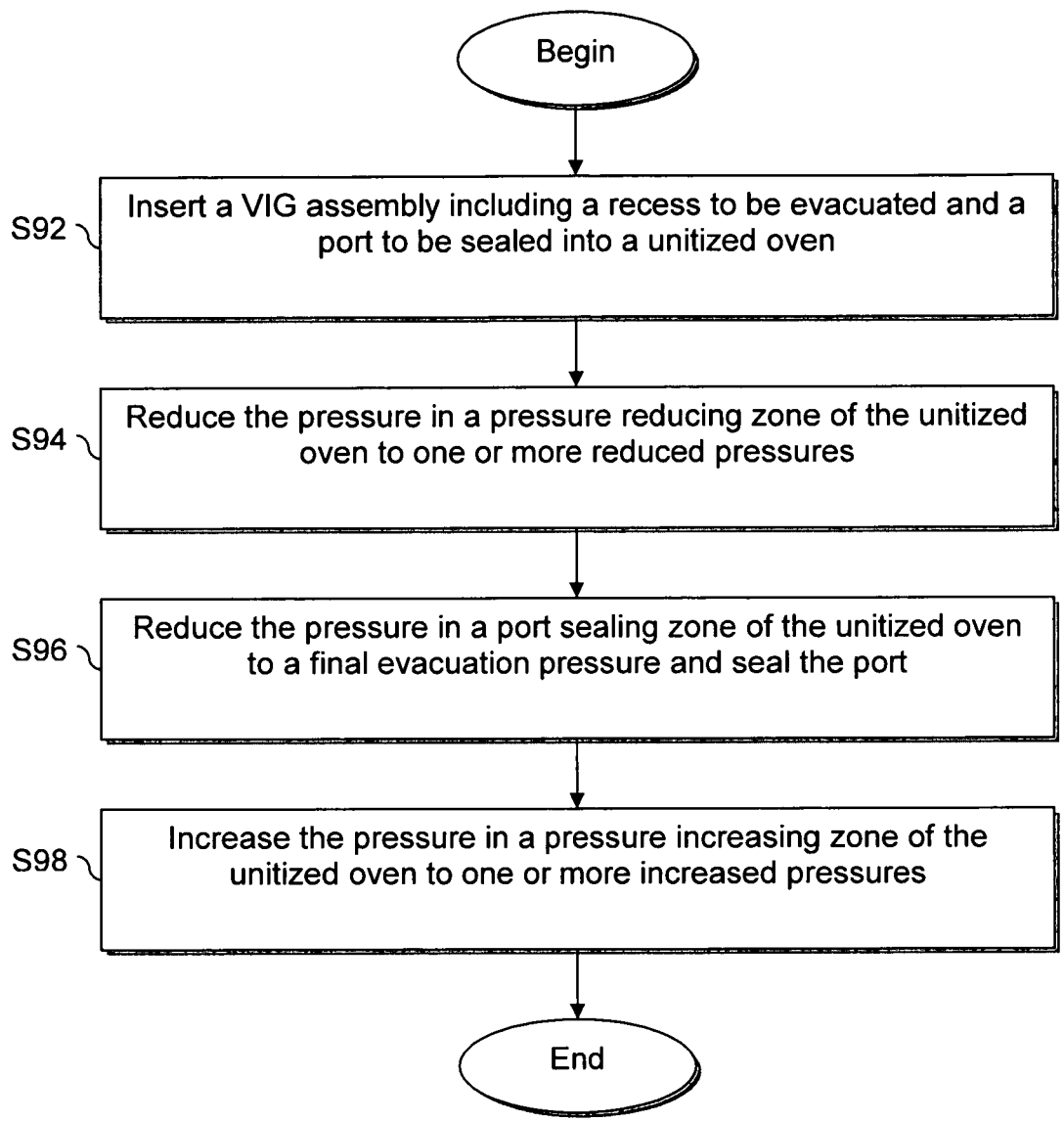
FIG. 9 is an illustrative flowchart showing a process for evacuating and sealing VIG assembly to produce a VIG unit, in accordance with an example embodiment.

FIG. 9 is an illustrative flowchart showing a process for evacuating and sealing VIG assembly to produce a VIG unit, in accordance with an example embodiment. In step S92, a unit comprising two substantially parallel spaced-apart substrates (defining a gap therebetween), an edge seal, and a pump-out port to be sealed, are inserted into a unitized oven. In step S94, the pressure in a pressure reducing zone of the oven is reduced to one or more reduced pressures. Optionally, in a step not shown, the temperature may be increased to facilitate the pumping-out process.

In step S96, the pressure in a port sealing zone of the oven is reduced to a final evacuation pressure. Optionally, in one or more steps not shown, purging gas(es) and/or plasma cleaning processes may be implemented. Once the final evacuation pressure is reached in the port sealing zone, the pump-out port is sealed. This may be accomplished using a sealing device located inside and/or outside of the port sealing zone.

The pressure in a pressure increasing zone of the oven is increased to one or more increasing pressures in step S98. Thus, the zone is brought up to atmospheric. Optionally, the temperature may be decreased, e.g., to allow for safer handling of the now-assembled VIG unit, etc.

An edge sealing oven connected to the oven or further chambers in the oven of FIG. 9 may serve edge sealing purposes. In certain example embodiments, edge sealing functions, e.g., described above, may be incorporated into the various example zones and/or chambers identified above.

It will be appreciated that the example embodiments described herein may be used in connection with a variety of different VIG assembly and/or other units or components. For example, the substrates may be glass substrates, heat strengthened substrates, tempered substrates, etc. As another example, the zones of the oven mentioned above (the pressure reducing zone, port sealing zone, and pressure increasing zone) may be separate and distinct zones, or alternatively may overlap or share common area in the oven(s).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulating glass (VIG) window unit, the method comprising:
    providing a unit comprising first and second substantially parallel spaced-apart glass substrates, edge seal material between the substrates, and wherein a gap is provided between the spaced apart substrates;
    performing an edge sealing process in a first heated zone having a temperature of no greater than about 200 degrees C., wherein the edge seal material is sealed to form an edge seal between the substrates in the first heated zone;
    after forming the edge seal, lowering a pressure of the gap between the substrates to a pressure below atmospheric pressure;
    in a port sealing zone at a substantially final evacuation pressure, sealing a pump-out port or tube at a temperature of no greater than about 200° C.; and
    after the sealing, providing the unit in a pressure increasing zone where pressure is increased.

2. The method of claim 1, wherein the first heated zone, a pressure reducing zone in which pressure of the gap between the substrates is at least initially lowered, a sealing zone wherein said sealing is performed, and the pressure increasing zone are separate and distinct zones.

3. The method of claim 1, wherein a pressure reducing zone in which pressure of the gap between the substrates is at least initially lowered, a sealing zone in which said sealing is performed, and the pressure increasing zone are not separate and distinct zones of an oven.

4. The method of claim 2, further comprising increasing a temperature of the unit substantially in its entirety before and/or during evacuating of the pressure reducing zone, and/or before and/or during evacuating of the sealing zone.

5. The method of claim 4, wherein the temperature of the unit is increased to about 200° C. before and/or during the evacuating of the sealing zone.

6. The method of claim 1, further comprising decreasing a temperature of the unit substantially in its entirety following evacuating of a sealing zone where said sealing is performed.

7. The method of claim 6, wherein the temperature of the unit is decreased to less than about 50° C. after the sealing of the pump-out port or tube.

8. The method of claim 2, further comprising during evacuating of the pressure reducing zone, respectively providing first and second reduced pressures in this order in first and second pressure reducing zone chambers of the pressure reducing zone, the first reduced pressure being less than or equal to about 1 torr and the second reduced pressure being less than or equal to about $10^{-2}$ torr.

9. The method of claim 1, wherein the final evacuation pressure of the gap is less than or equal to about $10^{-5}$ torr.

10. The method of claim 1, further comprising at least partially sealing the pump-out port by providing a cork and/or a plate proximate to the pump-out port of the unit.

11. The method of claim 1, wherein the unit comprises a pump-out tube at least partially inserted into a pump-out port, and wherein the pump-out port is provided in at least one of the glass substrates, and wherein the tube is sealed during said sealing.

12. The method of claim 11, further comprising at least partially collapsing the pump-out tube to at least partially seal the pump-out port by applying localized near-IR radiation thereto.

13. The method of claim 1, further comprising plasma cleaning the unit while the gap is at a pressure less than atmospheric.

14. A method of making a vacuum insulating glass (VIG) window unit, the method comprising:
   inserting into the oven a unit comprising first and second substantially parallel spaced-apart glass substrates, a gap defined by an area between the spaced apart substrates, a pump-out port formed in the first or second substrate, one or more edge portions of the first and second substrates to be sealed, and a frit provided at least partially between the first and second glass substrates for sealing said one or more edge portions to be sealed;
   pre-heating the unit substantially in its entirety to at least one intermediate temperature, each said intermediate temperature in the pre-heating being below a melting point of the first and second substrates and below a melting point of the frit;
   focusing localized near infrared (IR) inclusive heat at a localized temperature of from about 350 to 500 degrees C. directly onto the frit so as to at least partially melt the frit, the localized near IR heat being provided to the unit such that at least some areas of the unit not proximate to the edge portions to be sealed are kept at a temperature (s) below frit-melting temperature; and
   cooling the unit and allowing the fit to harden;
   evacuating the gap of the unit to at least one reduced pressure, each said reduced pressure being below atmospheric;
   further evacuating the gap of the unit to a substantially final evacuation pressure that is below the at least one reduced pressure;
   sealing the pump-out port of the unit during or after the evacuating of the recess to the substantially final evacuation pressure in forming a vacuum insulating glass (VIG) unit; and
   after the sealing, venting an area around the unit so as to bring a pressure of the area closer o atmospheric.

15. The method of claim 14, further comprising:
   initially providing the unit at room temperature; and
   during the pre-heating, providing first and second intermediate temperatures in this order, the first intermediate temperature being about 75° C. and the second intermediate temperature being about 150° C.

16. The method of claim 14, further comprising during the cooling, providing first and second reduced temperatures in this order, the first reduced temperature being about 150° C. and the second reduced temperature being less than about 100° C.

17. The method of claim 14, wherein the frit melting temperature is from about 350-500° C.

18. The method of claim 14, wherein the edge portions to be sealed extends around the entire periphery of the glass substrates, so that the seal extends around the entire periphery of the vacuum insulating glass unit.

19. The method of claim 14, further comprising increasing a temperature of the unit substantially in its entirety before and/or during the evacuating of the pressure reducing zone, and/or before and/or during the evacuating of the port sealing zone.

20. The method of claim 14, further comprising, during the evacuating of the gap to the at least one reduced pressure, respectively providing first and second reduced pressures in this order, the first reduced pressure being less than about 1 torr and the second reduced pressure being less than about $10^{-2}$ torr.

21. The method of claim 14, further comprising substantially sealing the edges to be sealed before beginning the evacuating.

* * * * *